(12) United States Patent
Praveen et al.

(10) Patent No.: US 12,450,485 B2
(45) Date of Patent: Oct. 21, 2025

(54) PRUNING NEURAL NETWORKS THAT INCLUDE ELEMENT-WISE OPERATIONS

(71) Applicant: NVIDIA CORPORATION, Santa Clara, CA (US)

(72) Inventors: Varun Praveen, Santa Clara, CA (US); Anil Ubale, Cupertino, CA (US); Parthasarathy Sriram, Los Altos, CA (US); Greg Heinrich, Nice (FR); Tayfun Gurel, Vantaa (FI)

(73) Assignee: NVIDIA Corporation, Santa Clara, CA (US)

( * ) Notice: Subject to any disclaimer, the term of this patent is extended or adjusted under 35 U.S.C. 154(b) by 911 days.

(21) Appl. No.: 16/197,986

(22) Filed: Nov. 21, 2018

(65) Prior Publication Data

US 2020/0160185 A1    May 21, 2020

(51) Int. Cl.
  *G06N 3/082*  (2023.01)
  *G06N 3/04*  (2023.01)
  *H04L 67/10*  (2022.01)

(52) U.S. Cl.
  CPC ............ *G06N 3/082* (2013.01); *G06N 3/04* (2013.01); *H04L 67/10* (2013.01)

(58) Field of Classification Search
  CPC ............ G06N 3/04; G06N 3/08; G06N 3/082; G06N 3/063; H04L 67/10
  See application file for complete search history.

(56) References Cited

U.S. PATENT DOCUMENTS

| | | | | |
|---|---|---|---|---|
| 11,423,259 | B1 * | 8/2022 | Pratusevich | G06N 20/00 |
| 2017/0102950 | A1 * | 4/2017 | Chamberlain | G06N 20/00 |
| 2018/0046906 | A1 * | 2/2018 | Dally | G06N 3/04 |
| 2018/0114114 | A1 * | 4/2018 | Molchanov | G06N 3/084 |
| 2018/0137417 | A1 * | 5/2018 | Theodorakopoulos | G06N 3/0454 |
| 2019/0050710 | A1 * | 2/2019 | Wang | G06N 3/063 |
| 2019/0050734 | A1 * | 2/2019 | Li | G06N 3/0454 |
| 2019/0122113 | A1 * | 4/2019 | Chen | G06N 3/084 |
| 2019/0197406 | A1 * | 6/2019 | Darvish Rouhani | G06N 20/00 |
| 2019/0378017 | A1 * | 12/2019 | Kung | G06N 3/084 |

(Continued)

FOREIGN PATENT DOCUMENTS

| | | |
|---|---|---|
| CN | 107977703 A | 5/2018 |
| WO | 2018119035 A1 | 6/2018 |

OTHER PUBLICATIONS

Chen, Tianshi, et al. "Diannao: A small-footprint high-throughput accelerator for ubiquitous machine-learning." ACM SIGARCH Computer Architecture News 42.1 (2014): 269-284. (Year: 2014).*

(Continued)

*Primary Examiner* — Randall K. Baldwin
(74) *Attorney, Agent, or Firm* — Davis Wright Tremaine LLP

(57) ABSTRACT

Input layers of an element-wise operation in a neural network can be pruned such that the shape (e.g., the height, the width, and the depth) of the pruned layers matches. A pruning engine identifies all of the input layers into the element-wise operation. For each set of corresponding neurons in the input layers, the pruning engine equalizes the metrics associated with the neurons to generate an equalized metric associated with the set. The pruning engine prunes the input layers based on the equalized metrics generated for each unique set of corresponding neurons.

21 Claims, 11 Drawing Sheets

(56) References Cited

U.S. PATENT DOCUMENTS

| | | | | |
|---|---|---|---|---|
| 2020/0334537 | A1* | 10/2020 | Yao | G06N 3/045 |
| 2021/0027166 | A1* | 1/2021 | Gorokhov | G06N 3/048 |
| 2021/0182077 | A1* | 6/2021 | Chen | G06T 1/60 |
| 2023/0024840 | A1* | 1/2023 | Chen | G06N 3/063 |

OTHER PUBLICATIONS

Wen, Wei, et al. "Learning structured sparsity in deep neural networks." Advances in neural information processing systems 29 (2016): 1-9 (Year: 2016).*
Molchanov, Pavlo, et al. "Pruning convolutional neural networks for resource efficient inference." arXiv preprint arXiv:1611.06440 (2016): 1-17 (Year: 2016).*
Li, Hao, et al. "Pruning filters for efficient convnets." arXiv preprint arXiv:1608.08710v3 (2017): 1-13. (Year: 2017).*
Zhou, Zhengguang, et al. "Online filter clustering and pruning for efficient convnets." 2018 25th IEEE International Conference on Image Processing (ICIP). IEEE, Oct. 2018: 11-15. (Year: 2018).*
Xie, Wenao, et al. "An energy-efficient FPGA-based embedded system for CNN application." 2018 IEEE international conference on electron devices and solid state circuits (EDSSC). IEEE, Jun. 2018. (Year: 2018).*
Yu, Ruichi, et al. "Nisp: Pruning networks using neuron importance score propagation." Proceedings of the IEEE conference on computer vision and pattern recognition. Jun. 2018: 9194-9203 (Year: 2018).*
Huang, Qiangui, et al. "Learning to prune filters in convolutional neural networks." 2018 IEEE Winter Conference on Applications of Computer Vision (WACV). IEEE, Mar. 2018: 709-718 (Year: 2018).*
Anwar, Sajid, Kyuyeon Hwang, and Wonyong Sung. "Structured pruning of deep convolutional neural networks." ACM Journal on Emerging Technologies in Computing Systems (JETC) 13.3 (2017): 1-18. (Year: 2017).*
Russakovsky, Olga, et al. "Imagenet large scale visual recognition challenge." International journal of computer vision 115 (2015): 211-252. (Year: 2015).*
Ardakani, Arash, Carlo Condo, and Warren J. Gross. "Activation pruning of deep convolutional neural networks." 2017 IEEE Global Conference on Signal and Information Processing (GlobalSIP). IEEE, 2017. (Year: 2017).*
Ardakani, Arash, Carlo Condo, and Warren J. Gross. "A multi-mode accelerator for pruned deep neural networks." 2018 16th IEEE International New Circuits and Systems Conference (NEWCAS). IEEE, Jun. 2018. (Year: 2018).*
Chen et al., "DianNao: A Small-Footprint High-Throughput Accelerator for Ubiquitous Machine Learning," ASPLOS 14, Mar. 1, 2014, 16 pages.
Extended European Search Report mailed Apr. 22, 2020, for Application No. 19210256.4, 14 pages.
IEEE, "IEEE Standard 754-2008 (Revision of IEEE Standard 754-1985): IEEE Standard for Floating-Point Arithmetic," Aug. 29, 2008, 70 pages.
Wen et al., "Learning Structured Sparsity in Deep Neural Networks," Proceedings of the 30th International Conference on Neural Information Processing Systems, Dec. 5, 2016, 10 pages.
Xie et al., "An Energy-Efficient FPGA-Based Embedded System for CNN Application," 2018 IEEE International Conference on Electron Devices and Solid State Circuits, Jun. 6, 2018, 2 pages.
Li et al., "Pruning Filters for Efficient Convnets", arXiv:1608.08710v3 [cs.CV], Mar. 10, 2017, pp. 1-13.
He et al., "Deep Residual Learning for Image Recognition", arXiv:1512.03385v1 [cs.CV], Dec. 10, 2015, pp. 1-12.
Russakovsky et al., "ImageNet Large Scale Visual Recognition Challenge", arXiv:1409.0575v3 [cs.CV], Jan. 30, 2015, pp. 1-43.
Han et al., "Learning both Weights and Connections for Efficient Neural Networks", arXiv:1506.02626v3 [cs.NE], Oct. 30, 2015, pp. 1135-1143.
Le Cun et al., "Optimal Brain Damage", Jun. 1990, in D. Touretzky (ed.), Advances in Neural Information Processing Systems, vol. 2, pp. 598-605.
Decision of Refusal for European Application No. 19210256.4, mailed Oct. 28, 2024, 16 pages.
Office Action for Chinese Application No. 201911141802.3, mailed Dec. 6, 2024, 10 pages.
Office Action for Chinese Application No. 201911141802.3, mailed Jan. 8, 2024, 29 pages.
Extended European Search Report for Application No. 25150039.3, mailed Apr. 14, 2025, 10 pages.
Office Action for Chinese Application No. 201911141802.3, mailed Feb. 8, 2025, 10 pages.
Office Action for Chinese Application No. 201911141802.3, mailed Jul. 29, 2024, 8 pages.

* cited by examiner

PRUNING NEURAL NETWORKS THAT INCLUDE ELEMENT-WISE OPERATIONS

BACKGROUND

Neural networks are often overparametrized to facilitate training. The overparametrization leads to computationally complex and memory intensive neural networks with many redundant connections between layers. A neural network can be pruned to deactivate connections in order to reduce the complexity of the network. In some cases, pruning a neural network degrades the performance or otherwise impacts the accuracy of the neural network. For example, pruning input layers into an element-wise operation in the neural network may prevent the execution of or otherwise impact the performance of the element-wise operation.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
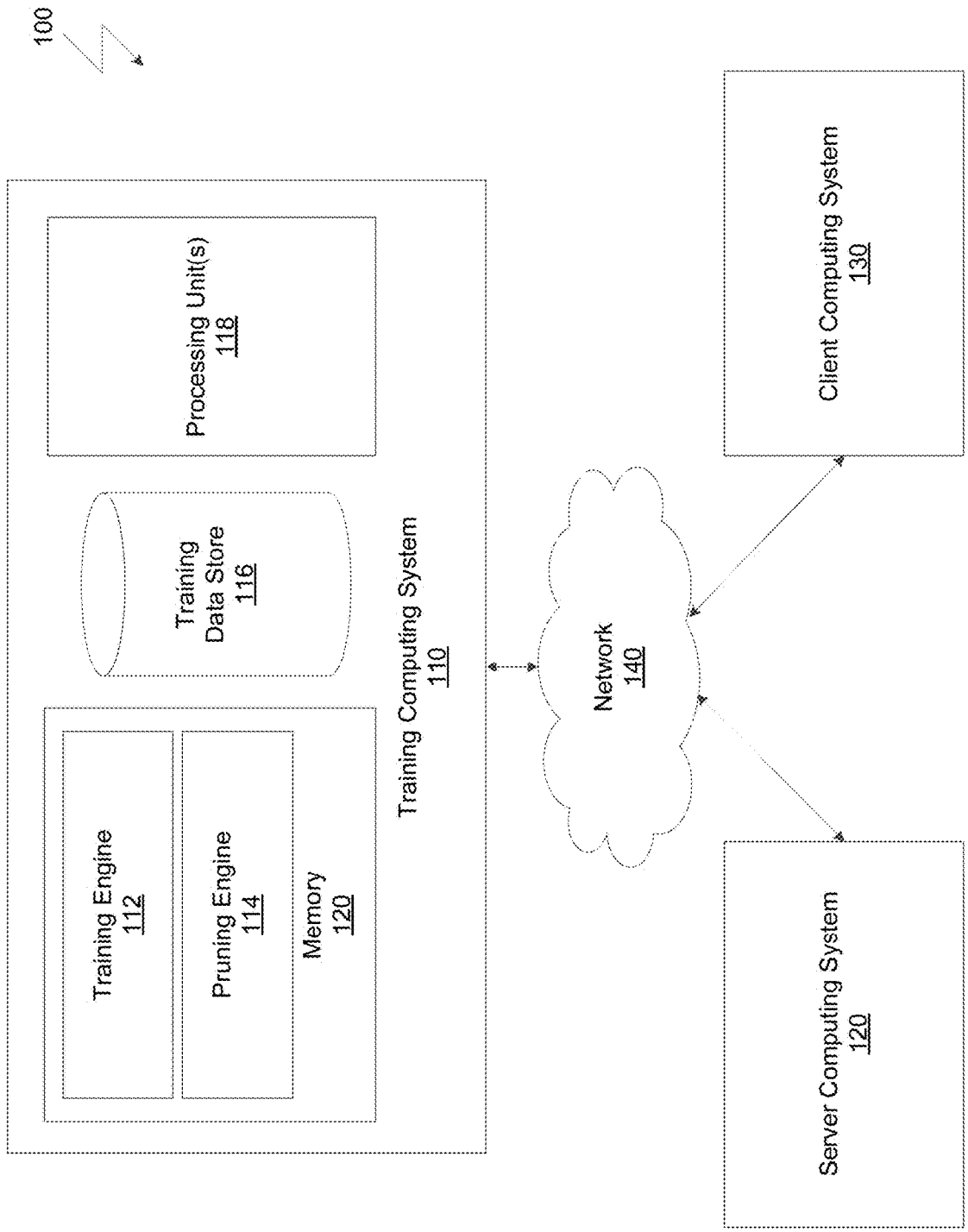
FIG. 1 illustrates a system configured to implement one or more aspects of various embodiments.

FIG. 1 illustrates a system 100 configured to implement one or more aspects of various embodiments. As shown, the computer system 100 includes a training computing system 110, a server computing system 120, and a client computing system 130 that are communicatively coupled through a network 140.

In one embodiment, the training computing system 110 includes a memory 120, a training data store 116, and one or more processing units 118. The one or more processing units 118 can include any technically feasible set of hardware units configured to process data and execute software applications. For example, a processing unit 118 can be a central processing unit, a graphics processing unit, a microprocessor, an ASIC, a FPGA, a controller, or a microcontroller.

In one embodiment, the memory 120 can include one or more non-transitory computer-readable storage mediums, such as RAM, ROM, EEPROM, EPROM, flash memory devices, magnetic disks, etc., and combinations thereof. In one embodiment, the memory 120 stores data and instructions that are executed by the one or more processing units 118. In one embodiment, the memory 120 includes a training engine 112 and a pruning engine 114 that are executed by the one or more processing units 118.

In one embodiment, the training engine 112 trains neural networks through various machine learning techniques using training data stored in the training data store 116. The machine learning techniques include, but are not limited to, gradient descent and regularization. In one embodiment, the training engine 112 trains neural networks. For example, in various embodiments, the training engine 112 could train a recurrent neural network (RNN), a convolutional neural network (CNN), a deep neural network (DNN), a deep convolutional network (DCN), a deep belief network (DBN), a generative adversarial network (GAN), a self-organizing map (SOM), or any other technically feasible type of neural network.

In one embodiment, a neural network, such as a CNN, includes one or more convolutional layers, one or more pooling layers, and/or one or more fully connected layers. In one embodiment, each layer is configured to transform a three-dimensional (3D) input volume into a 3D output volume using a differentiable function having one or more parameters. The layers of the neural networks can include a plurality of neurons arranged in three dimensions (e.g. width, height, and depth). In one embodiment, the neurons in a given layer of the neural network are connected to a small portion of the previous layer. The convolutional layers can be configured to compute the output of the neurons that are connected to local regions in the input.

In one embodiment, the training engine 112 trains the neural network in an incremental manner by gradually increasing an amount of connections between layers of the neural network. For example, the training engine 112 can initialize the neural network for incremental training by deactivating all but a small fraction (e.g. 1%, 0.1%, etc.) of connections. The training engine 112 can incrementally increase the number of connections of the neural network, such that the training engine 112 then performs the training on the neural network having the increased number of connections. This process can be repeated one or more times such that the training engine 112 gradually increases the number of connections in the neural network and trains the neural network 140 as the connections are gradually increased.

In one embodiment, the training engine 112 densifies the neural network in any suitable manner in accordance with various suitable training techniques used to train the neural network. For example, the training engine 112 may determine a densification scheme that defines time intervals for increasing the connections and an amount by which the connections will be increased. In one embodiment, the densification scheme can be determined based at least in part on the training technique used by the training engine 112 to train the neural network. The densification scheme can be further determined based at least in part on the parameters of the convolutional layers and/or a number of possible connections within the neural network.

In one embodiment, the pruning engine 114 prunes neurons within layers of a neural network. In various embodiments, the pruning engine 114 prunes a neural network trained by the training engine 112. In one embodiment, pruning the neural network reduces the overall complexity of the neural network, and, thus, the computational and memory requirements associated with the neural network are reduced. In one embodiment, the pruning engine 114 selects the neurons to be pruned in order to reduce the impact of the pruning on the performance of the neural network. The pruning engine 114 deactivates the neurons that are selected for pruning from the neural network and also deactivates any connections in the neural network to the selected neurons. The descriptions corresponding to FIGS. 2-7 below provide additional details of various embodiments related to the pruning engine 114.

In one embodiment, the training data store 116 stores training data and parameters related to training and/or pruning the neural networks. In one embodiment, the parameters are used by the training engine 112 and/or the pruning engine 114 during the training and/or pruning of the neural network. The parameters includes, but are not limited to, the number of layers, the number of neurons per layer, the number of training iterations, the number of hidden neurons, the learning rate.

In one embodiment, the server computing system 120 stores neural networks generated by the training computing system 110. In one embodiment, the server computing system 120 includes or is otherwise implemented by one or more server computing devices. In instances in which the server computing system 120 includes multiple server computing devices, such server computing devices can operate according to sequential computing architectures, parallel computing architectures, or some combination thereof. In one embodiment, the server computing system 120 may be a part of the training computing system 110.

In one embodiment, the client computing system 130 receives trained and/or pruned neural networks from the server computing system 120. The client computing system 130 may implement one or software applications that use or otherwise process the neural network(s) received from the server computing system 120 to perform operations. These operations include, but are not limited to, classification operations, computer vision operations, and anomaly detection operations. In one embodiment, the client computing system 130 is an autonomous vehicle. In another embodiment, the client computing system 130 is a mobile computing device, such as a smartphone or a smartwatch.

The network 140 can be any type of communications network, such as a local area network (e.g., intranet), wide area network (e.g., Internet), or some combination thereof and can include any number of wired or wireless links. Communication over the network 140 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Pruning Neural Networks

Figure 2A:
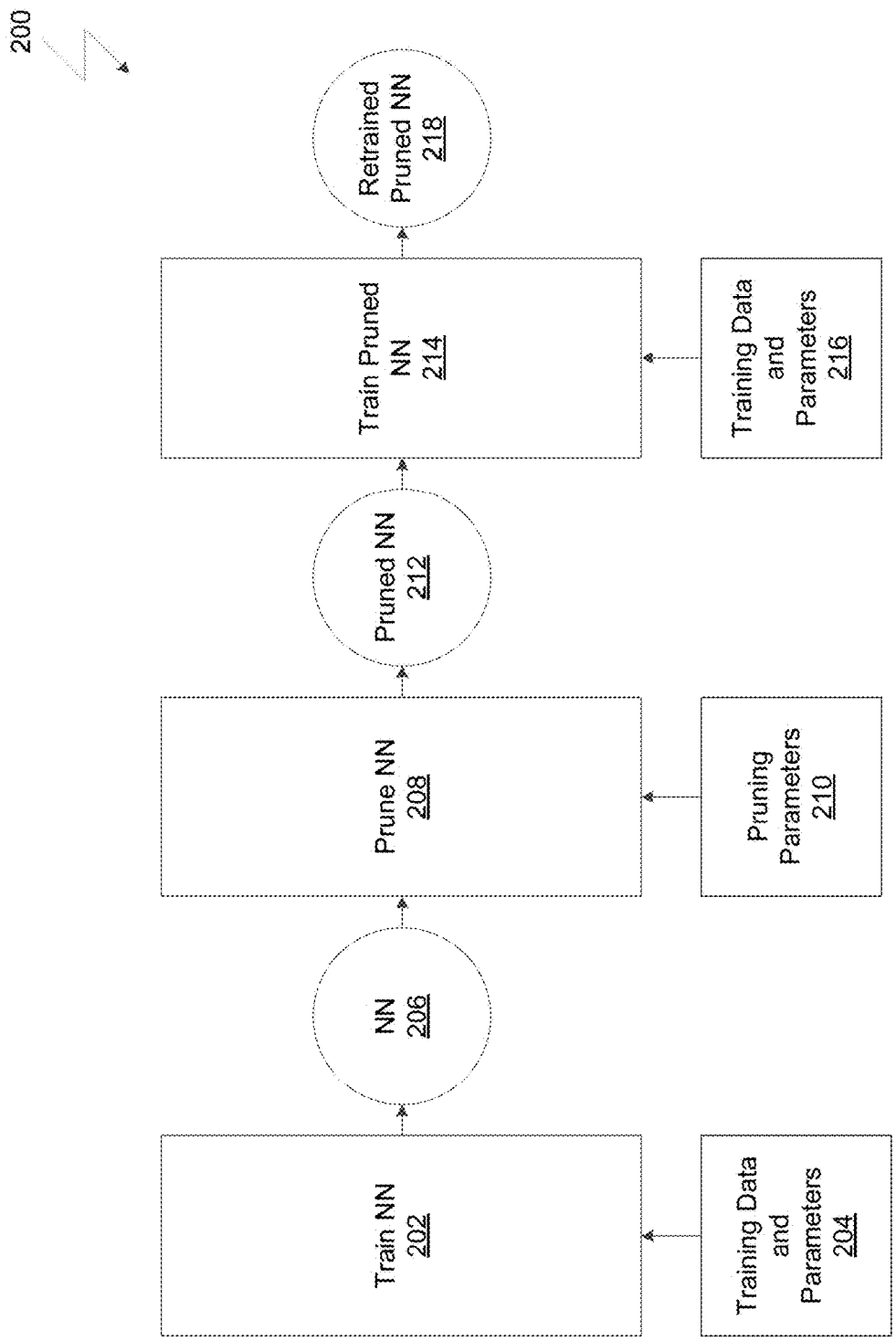
FIG. 2A illustrates a pruning workflow for pruning a neural network, according to various embodiments.

FIG. 2A illustrates a pruning workflow 200 for pruning a neural network, according to various embodiments. The pruning workflow 200 may be implemented by the training computing system 110 of FIG. 1.

In one embodiment, the pruning workflow 200 begins with the training engine 112 training 202 a neural network based on training data and parameters 204 to generate the neural network 206. As discussed above, the training engine 112 may employ one or more machine learning techniques to train a neural network based on training data and parameters stored in the training data store 116. In one embodiment, the training data and parameters 204 govern one or more characteristics of the neural network, such as network density and the number of layers in the neural network. The training 202 results in the neural network 206. In one embodiment, the neural network 206 includes one or more convolutional layers, one or more pooling layers, and/or one or more fully connected layers. The layers of the neural networks can include a plurality of neurons arranged in three dimensions (e.g. width, height, and depth) and each associated with one or more weights. In one embodiment, each neuron is associated with a feature type and operates on input data to computationally determine a degree or probability of the presence of a feature having the feature type in the input data. Examples of feature type include color, shape, size, and dimension. In one embodiment, the training engine 112 implements one or more regularization operations during the training 202 to promote neurons associated with low-magnitude weights.

In one embodiment, the pruning engine 114 prunes 208 the neural network 206 based on pruning parameters 210 to deactivate one or more neurons and the associated connections to generate the pruned neural network 212. In various embodiments, deactivating a neuron may also be referred to as removing the neuron from the pruned neural network. In one embodiment, the pruning parameters 210 may refer to metrics associated with neurons. In one embodiment, the pruning engine 114 selects neurons having a corresponding metric below a pruning threshold. The metric may be determined based on one or more weights associated with the neuron. In one embodiment, the metric may be the L2 norm of one or more weights associated with the neuron. The pruning engine 114 deactivates the selected neurons and any associated connections to and from the selected neurons from the neural network 206 to generate the pruned neural network 212.

In one embodiment, the training engine 112 retrains 214 the pruned neural network 212 to generate the retrained pruned neural network 218. In various embodiments, the training engine 112 may employ one or more machine learning techniques to retrain the pruned neural network 212 based on training data and parameters 216 stored in the training data store 116. The pruned neural network 212 may be retrained to regain, at least partially, a loss in accuracy caused by the removal of neurons during the pruning process. In one embodiment, the training engine 112 applies regularization techniques that limit the weights associated with the different neurons in the initial neural network training 202 but not when retraining 414 the pruned neural network 212.

Figure 2B:
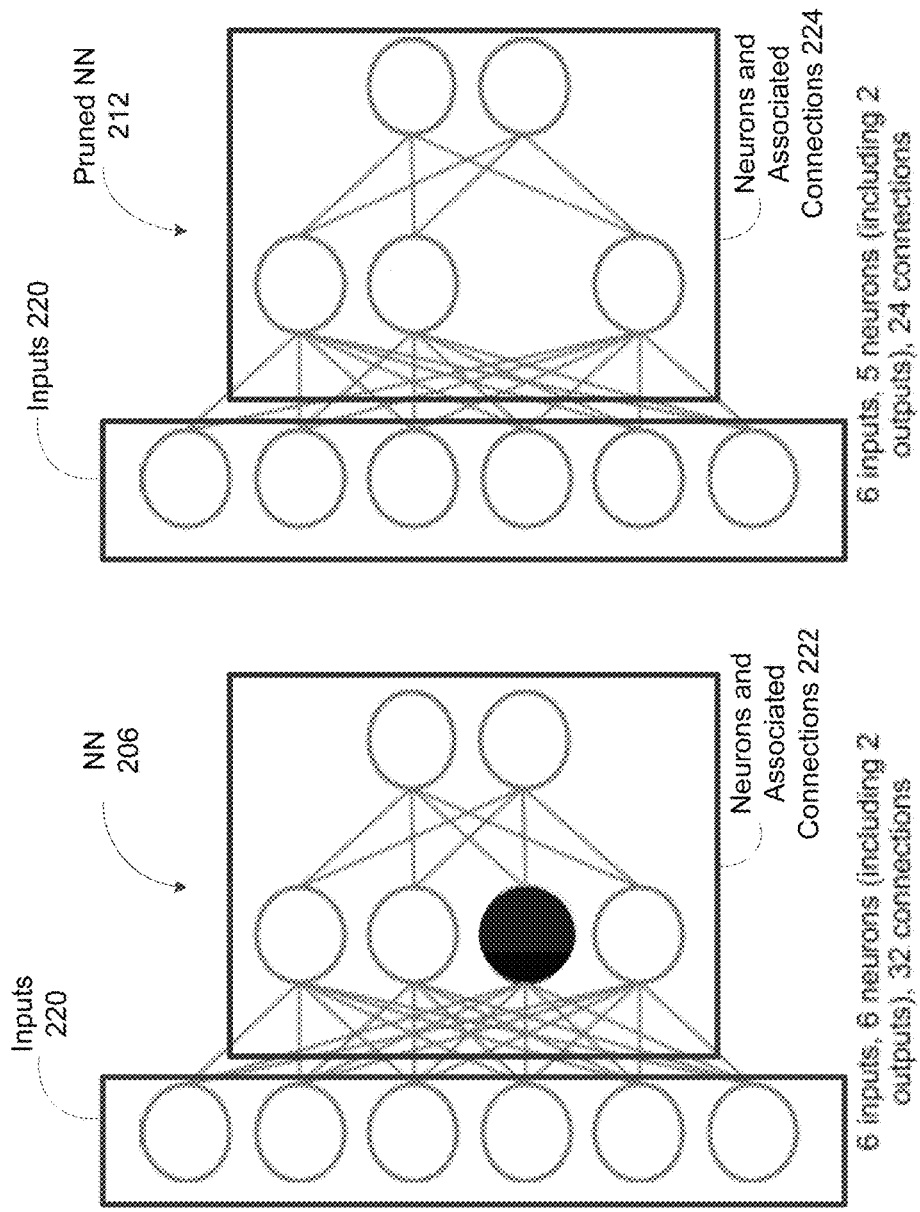
FIG. 2B illustrates an example of a neural network and pruned neural network, according to various embodiments.

FIG. 2B illustrates an example of a neural network 206 and pruned neural network 212, according to various embodiments. As shown, the neural network 206 includes input nodes 220 and neurons and their associated connections 222, and the pruned neural network 212 includes input nodes 220 and neurons and their associated connections 224. In the example, the neural network 206 includes six input nodes 220, six neurons, and thirty-two connections. The third neuron from the top in the neural network 206 is deactivated in the pruning process to generate the pruned neural network 212. Thus, as shown, the pruned neural network 212 includes six inputs, five neurons, and twenty-four connections, Pruning Input Layers to an Element-Wise Operation in a Neural Network In various embodiments, a neural network includes one or more element-wise computational operations that operate upon two or more input layers included in the neural network. In operation, the element-wise computational operation performs an operation on the results produced by each unique set of corresponding neurons in the input layers. For example, the neural network may include an element-wise addition operation to be performed on two input layers of the neural network. When performing the element-wise addition operation, the addition operation is performed on the result produced by each neuron in a set of corresponding neurons across the two input layers. In various embodiments, the corresponding neurons are located at the same location within the respective input layers. For example, assume layer 1 and layer 2 are input layers into an element-wise addition operation. In such an example, a first element-wise addition operation will be performed on neuron A at a first width, height, and depth within layer 1 and neuron B at the same width, height, and depth in layer 2, a second element-wise addition operation will be performed on neuron C at a second width, height, and depth within layer 1 and neuron D at the same width, height, and depth in layer 2, and so forth. In various embodiments, the corresponding neurons are associated with the same feature type.

Figure 2C:
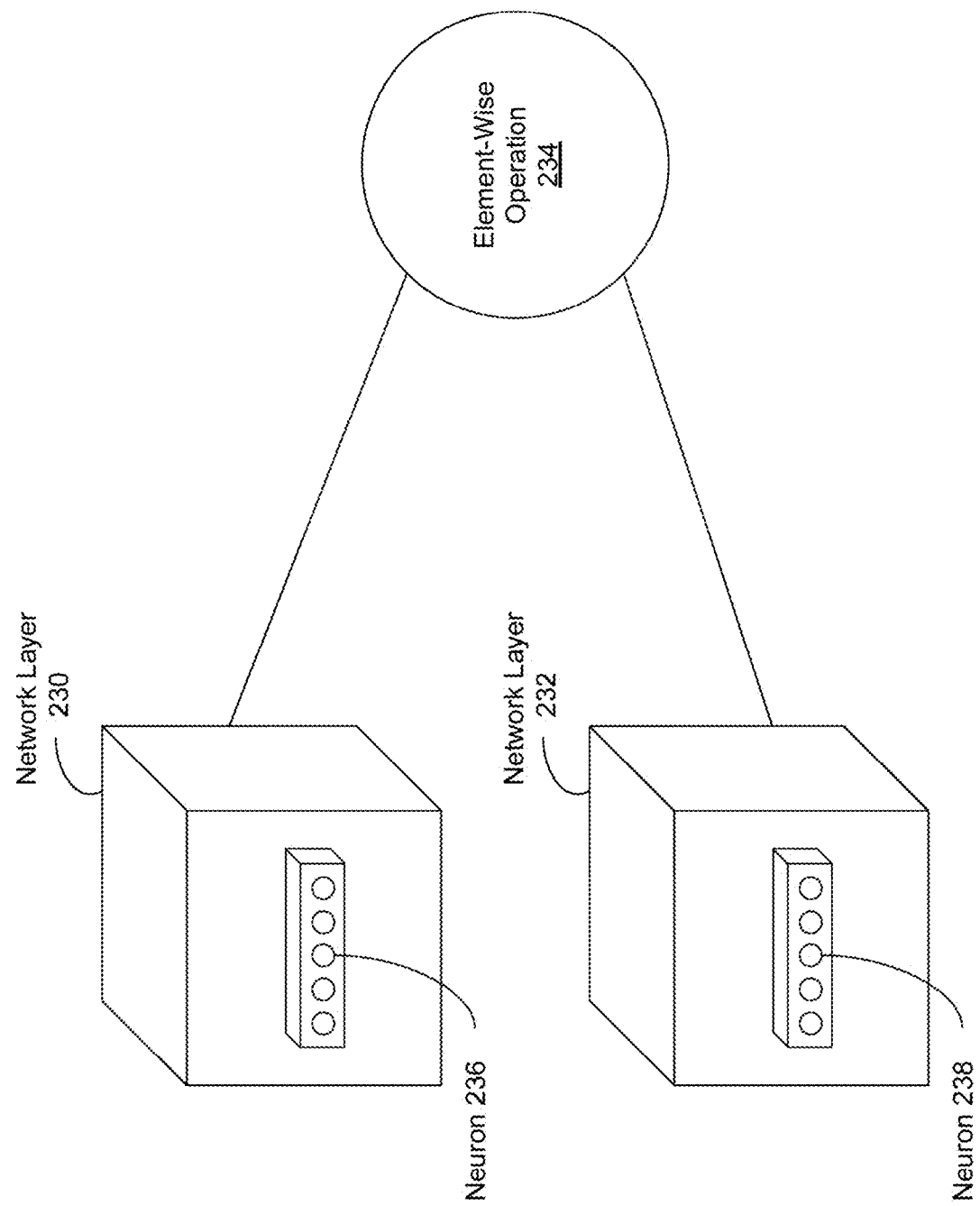
FIG. 2C illustrates a portion of a neural network that includes an element-wise operation, according to various embodiments.

FIG. 2C illustrates a portion of a neural network that includes an element-wise operation 234, according to various embodiments. As shown, the neural network also includes a network layer 230 and a network layer 232. Network layer 230 includes neurons, such as neuron 236, located at different locations within the network layer. Network layer 232 also includes neurons, such as neuron 238, located at different locations within the network layer. In the embodiment in FIG. 2C, the network layer 230 and the network layer 232 are three-dimensional such that each neuron has a corresponding three-dimensional coordinate. In other embodiments, the network layer 230 and the network layer 232 may be one-, two-, four-dimensional or have any other higher dimensionality.

In one embodiment, each neuron in the network layer 230 and/or the network layer 232 operates on input data to produce a result. In one example, the result is a feature map. The element-wise operation 234 performs an operation on results produced by corresponding neurons in the network layer 230 and the network layer 232. In the embodiment shown, the neuron 236 and neuron 238 are corresponding neurons. In one embodiment, corresponding neurons are those neurons that are located at the same location (e.g., coordinates or index) within the respective input layers. In one embodiment, corresponding neurons are those neurons that are associated with the same feature type.

In various embodiments, when pruning a neural network having one or more element-wise operations, the input layers to the element-wise operations are pruned such that the element-wise operations can be accurately performed on the pruned layers. More particularly, subsequent to the pruning operations, the shape, e.g., the width, height, and depth, of the input layers needs to match so that the element-wise operations can be performed.

The following discussion outlines one or more techniques for pruning layers of a neural network.

Figure 3:
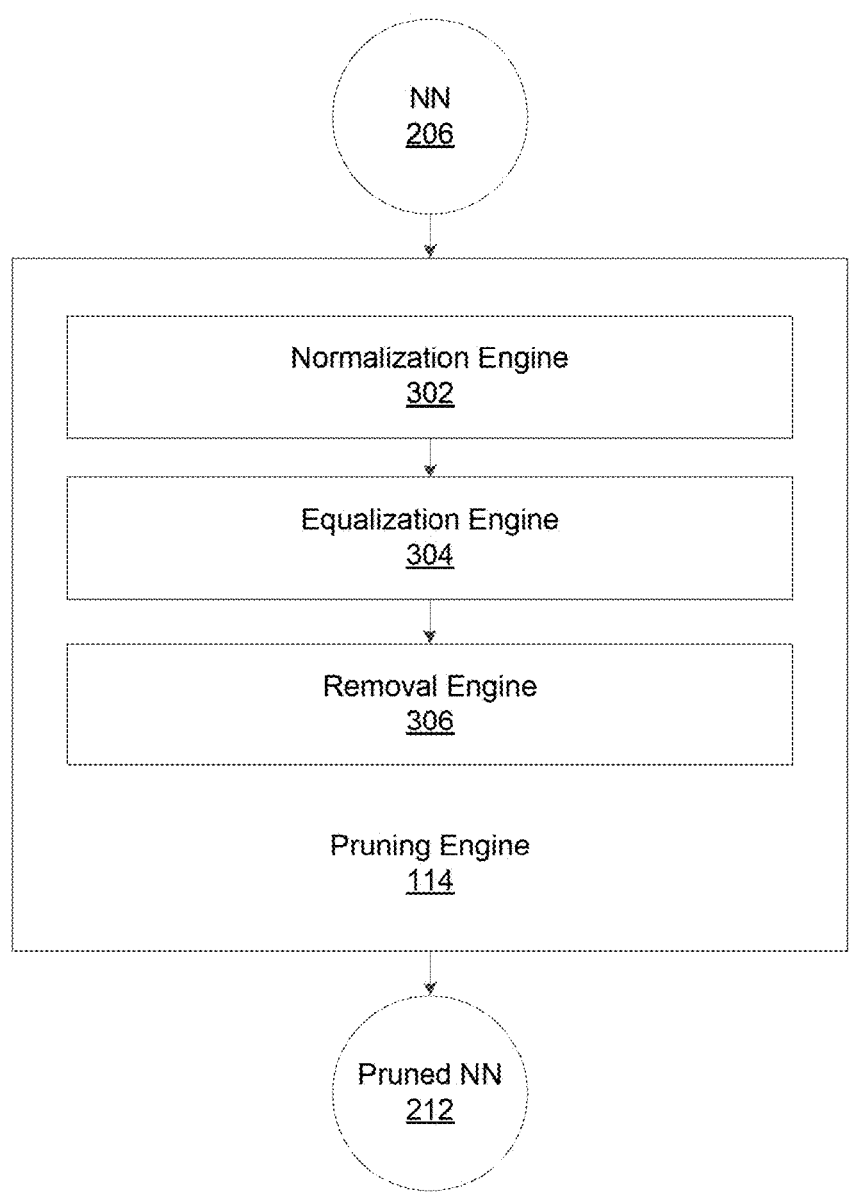
FIG. 3 is a detailed illustration of the pruning engine of FIG. 1, according to various embodiments.

FIG. 3 is a detailed illustration of the pruning engine 114 of FIG. 1, according to various embodiments. As shown, the pruning engine 114 includes a normalization engine 302, an equalization engine 304, and a removal engine 306. In one embodiment, the pruning engine 114 receives a trained neural network 206 as an input and generates a pruned neural network 212. For the purposes of discussion, in the embodiment of FIG. 3, the trained neural network 206 includes at least one element-wise operation having two or more input layers.

In one embodiment, the normalization engine 302 processes the neural network 206 to generate a metric associated with each of the neurons included in one or more layers included in the neural network 206. In one embodiment, the metric associated with a given neuron is an L2 norm of the weights associated with the neuron. In one embodiment, the normalization engine 302 stores the metric for each neuron in the neural network 206.

In one embodiment, the equalization engine 304 operates on layers of the neural network 206 that are inputs into an element-wise computation operation. In various embodiments, the element-wise computation operation performs an operation on the results of each unique set of corresponding neurons in the input layers. In one embodiment, an element-wise computational operation may be an element-wise binary operation, such as an element-wise addition operation, an element-wise subtraction operation, an element-wise multiplication operation, an element-wise division operation, element-wise logical AND operation, element-wise logical OR operation, element-wise maximum operation, etc.

For each element-wise operation in the neural network 206, the equalization engine 304 identifies all of the input layers into the element-wise operation. For each set of corresponding neurons in the input layers, the equalization engine 304 equalizes the metrics associated with the neurons included in the set of corresponding neurons. As discussed above, corresponding neurons in two or more layers include neurons that are in the same location within the respective layers. In one embodiment, to equalize a set of corresponding neurons, the equalization engine 304 applies an equalization operator to the metrics associated with the set of corresponding neurons. In one embodiment, all of the metrics associated with the set of corresponding neurons are set to the same value once the equalization operation is applied.

In various embodiments, the equalization operator is a multivariate commutative operator. In one embodiment, the equalization operator is an arithmetic mean operator. When applying the arithmetic mean operator, the equalization engine 304 computes an arithmetic mean of the metrics associated with the set of corresponding neurons. In one embodiment, the metric of each neuron in the set of corresponding neurons is replaced with the computed arithmetic mean. In one embodiment, the arithmetic mean may be computed using the following equation:

$$F(x_1 \ldots x_n) = \Sigma \frac{x_n}{N} \qquad (2)$$

where $F(x_1 \ldots x_n)$ is the arithmetic mean, $(x_1 \ldots x_n)$ are the metrics associated with the set of corresponding neurons, and N is the total number of neurons in the corresponding the set.

In one embodiment, the equalization operator is a geometric mean operator. When applying the geometric mean operator, the equalization engine 304 computes an geometric mean of the metrics associated with the set of corresponding neurons. In one embodiment, the metric of each neuron in the set of corresponding neurons is replaced with the computed geometric mean. In one embodiment, the arithmetic geometric may be computed using the following equation:

$$F(x_1 \ldots x_n) = \Pi x_n^{\frac{1}{N}} \qquad (3)$$

where $F(x_1 \ldots x_n)$ is the geometric mean, $(x_1 \ldots x_n)$ are the metrics associated with the set of corresponding neurons, and N is the total number of neurons in the corresponding the set.

In one embodiment, the equalization operator is a union operator. When applying the union operator, the equalization engine 304 sets the metric of each neuron in the set of neurons to a threshold pruning weight when at least one of the metrics associated with the set of neurons is equal to or above the threshold pruning weight. In one embodiment, if none of the metrics associated with the set of neurons is equal to or above the threshold pruning weight, then the equalization engine 304 sets the metric of each neuron in the set of neurons to below the threshold pruning weight. In one embodiment, the metric of each neuron in the set of neurons may be determined using the following equation:

$$F=(x_1 \ldots x_n)=t \text{ if } \exists x_n, x_n \geq t \text{ else } t-\in \qquad (4)$$

where $F(x_1 \ldots x_n)$ is the value to which the metric of each neuron is set, and t is the threshold pruning weight.

In one embodiment, the equalization operator is an intersection operator. When applying the intersection operator, the equalization engine 304 sets the metric of each neuron in the set of neurons to a threshold pruning weight when all of the metrics associated with the set of neurons are equal to or above the threshold pruning weight. In one embodiment, if at least one of the metrics associated with the set of neurons is below the threshold pruning weight, then the equalization engine 304 sets the metric of each neuron in the set of neurons to below the threshold pruning weight. In one embodiment, the metric of each neuron in the set of neurons may be determined using the following equation:

$$F=(x_1 \ldots x_n)=t \text{ if } \forall x_n, x_n \geq t \text{ else } t-\in \qquad (5)$$

where $F(x_1 \ldots x_n)$ is the value to which the metric of each neuron is set, and t is the threshold pruning weight.

In one embodiment, the equalization engine 304 provides the equalized metrics associated with each set of corresponding neurons to the removal engine 306. In one embodiment, the equalization engine 304 generates an equalization vector that includes, for each set of corresponding neurons in the input layers to the element-wise operation, a corresponding equalized metric. In one embodiment, the equalization engine 304 transmits the equalization vector to the removal engine 306.

In one embodiment, the removal engine 306 prunes layers of the neural network 206 to generate the pruned neural network 212. In one embodiment, the pruned input layers are included in the pruned neural network 212 instead of the input layers included in the neural network 206. In one embodiment, the removal engine 306 prunes the input layers to the element-wise operation based on the equalized metrics associated with each set of corresponding neurons in the input layers. The removal engine 306 deactivates neurons from the input layers that have an equalized metric that is less than a threshold pruning weight. In various embodiments, the threshold pruning weight may be specified by an administrator of the training computing system 110, may be determined based on weights associated with the neurons in the input layers, or may be learned based on the neural network 206 or other neural networks. Other techniques for determining the threshold pruning are within the scope of the disclosure.

In one embodiment, the specific neurons that are deactivated by the removal engine 306 depends on the equalization operator applied by the equalization engine 304 when equalizing the metrics associated with the sets of corresponding neurons. In one embodiment, when the arithmetic mean operator or the geometric mean operator is applied to the metrics, the arithmetic or the geometric mean of the metrics associated with a set of corresponding neurons must be below the threshold pruning weight for the set of corresponding neurons to be deactivated. In one embodiment, when the union operator is applied to the metrics, the metric associated with each neuron in a set of corresponding neurons must be below the threshold pruning weight for the set of corresponding neurons to be deactivated. In one embodiment, when the intersection operator is applied to the metrics, the metric associated with at least one neuron in a set of corresponding neurons must be below the threshold pruning weight for the set of corresponding neurons to be deactivated.

In one embodiment, the removal engine 306 prunes the input layers based on a desired dimensionality of the pruned input layers. The removal engine 306 prunes the input layers such that the pruned input layers have the desired dimension. For example, in some instances, the computation related to the neural network 206 is more efficient when the pruned layers of the neural network have dimensions that are powers of two. In such an example, the removal engine 306 deactivates neurons from the input layers while also maintaining the desired dimensions of the input layers.

Figure 4:
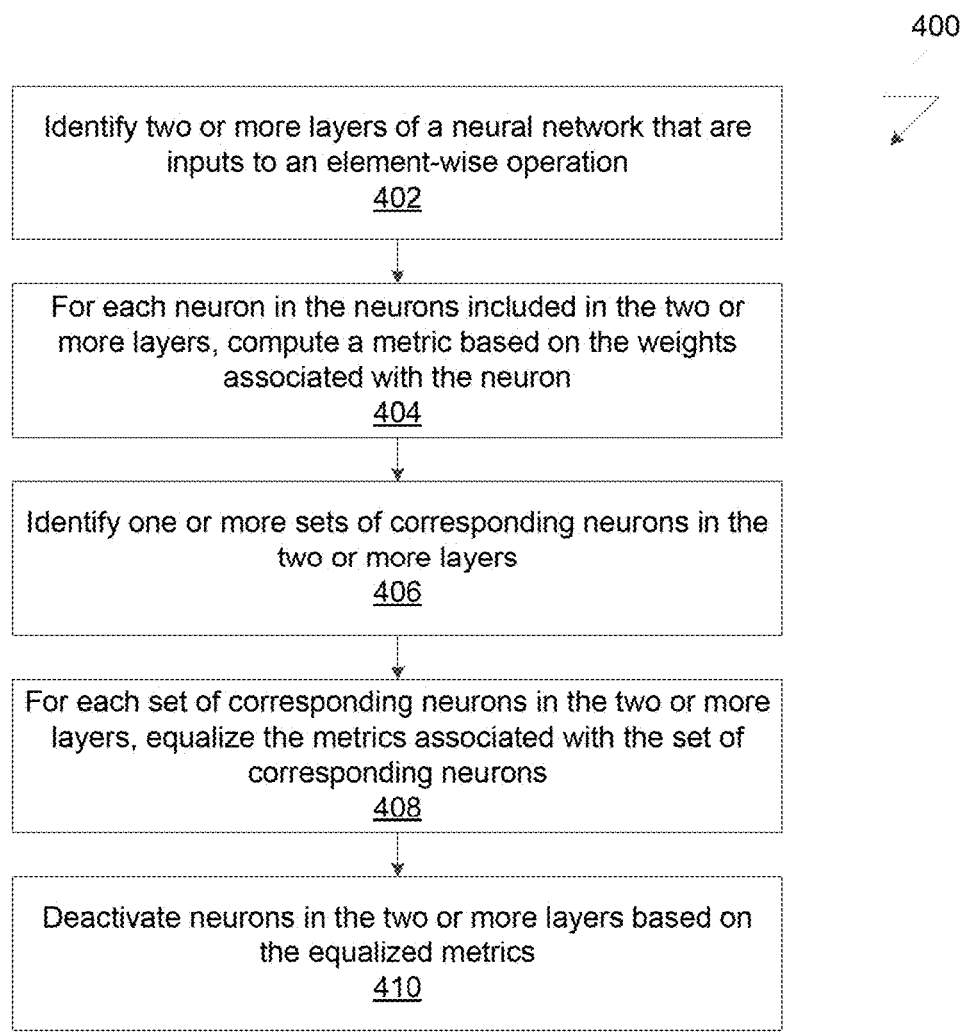
FIG. 4 is a flow diagram of method steps for pruning input layers to an element-wise operation included in a neural network, according to various embodiments.

FIG. 4 is a flow diagram of method steps for pruning input layers to an element-wise operation included in a neural network, according to various embodiments. Although the method steps are described in conjunction with the systems of FIGS. 1 and 3, persons skilled in the art will understand that any system configured to perform the method steps in any order falls within the scope of the present disclosure.

The method 400 begins at step 402, where the pruning engine 114 identifies two or more layers of a neural network that inputs into an element-wise operation. At step 404, the pruning engine 114 computes, for each neuron included in the two or more layers identified at step 402, a metric based on the weights associated with the neuron.

At step 406, the pruning engine 114 identifies one or more sets of corresponding neurons in the two or more layers identified at step 402. As discussed above, corresponding neurons in two or more layers include neurons that are in the same location within the respective layers. The element-wise operation performs an operation on each unique set of corresponding neurons in the input layers.

At step 408, the pruning engine 114, for each set of corresponding neurons included in the two or more layers of the neural network identified at step 402, equalizes the metrics associated with the set of corresponding neurons. In one embodiment, in order to equalize the metrics associated with a set of corresponding neurons, the equalization engine 304 applies an equalization operator to the metrics associated with the set of corresponding neurons. In one embodiment, all of the metrics associated with the set of corresponding neurons are set to the same value once the equalization operator is applied.

At step 410, the pruning engine 114 deactivates neurons from the two or more layers of the neural network identified at step 402 based on the equalized metrics. In one embodiment, the pruning engine 114 deactivates neurons from the input layers that have an equalized metric that is less than a threshold pruning weight. In one embodiment, the pruned input layers are included in the pruned neural network instead of the input layers included in the unpruned neural network.

Pruning Layers of a Residual Network

Residual networks are a type of neural network that include element-wise operations. In various embodiments, the above techniques for pruning may be applied when pruning a residual network in order to maintain the accuracy of the element-wise operations included in the residual network.

Figure 5:
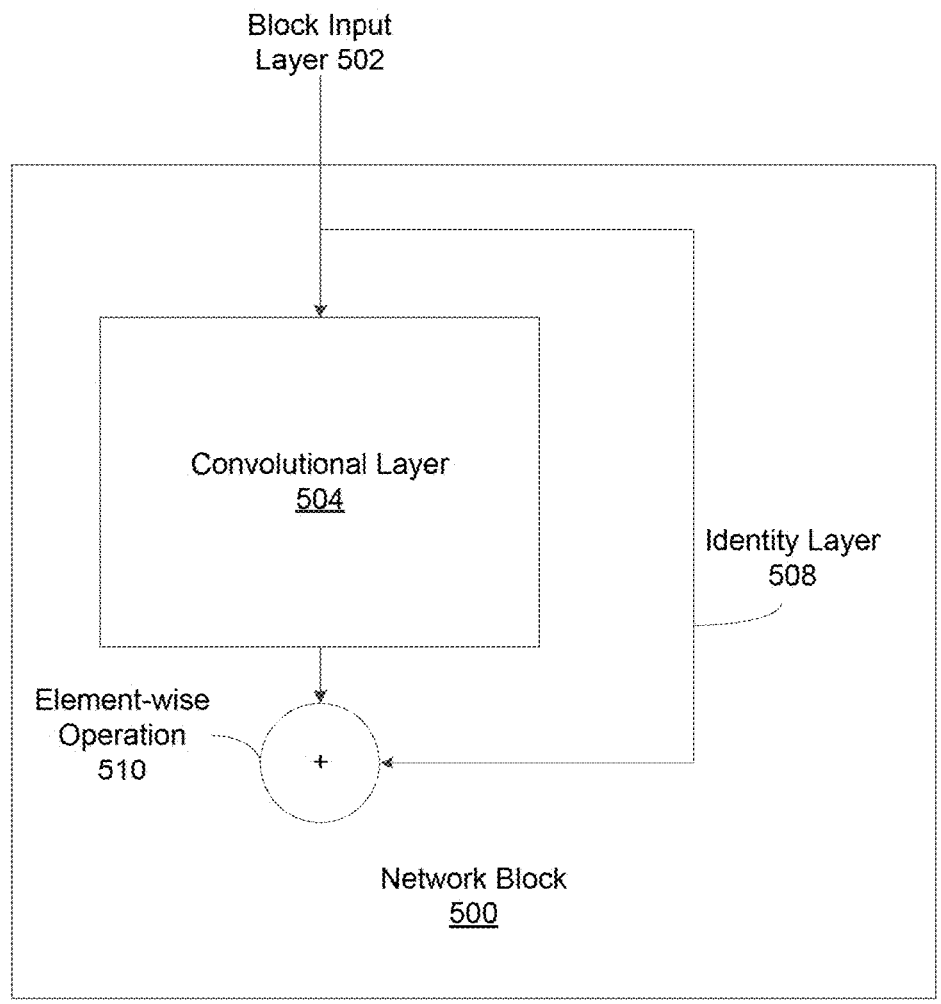
FIG. 5 illustrates the architecture of a network block in a residual network, according to various embodiments.

FIG. 5 illustrates the architecture of a network block 500 in a residual network, according to various embodiments. As shown, the network block 500 includes a block input 502, a convolutional layer 504, an identity layer 508, and an element-wise operation 510. The convolutional layer 504 is included in the residual branch of the network block 500. The identity layer 508 is included in the non-residual branch of the network block 500. In one embodiment, the identity layer 508 matches the block input layer 502.

In one embodiment, the element-wise operation 510 is an element-wise addition operation. In one embodiment, the convolutional layer 504 and the identity layer 508 are inputs into the element-wise operation 510. In order to maintain the accuracy of the element-wise operation 510, the size and shape of the convolutional layer 504 and the identity layer 508 need to be the same. Therefore, when pruning the residual network, the convolutional layer 504 and the identity layer 508 need to be pruned such that the size and shape of the pruned layer matches.

Figure 6:
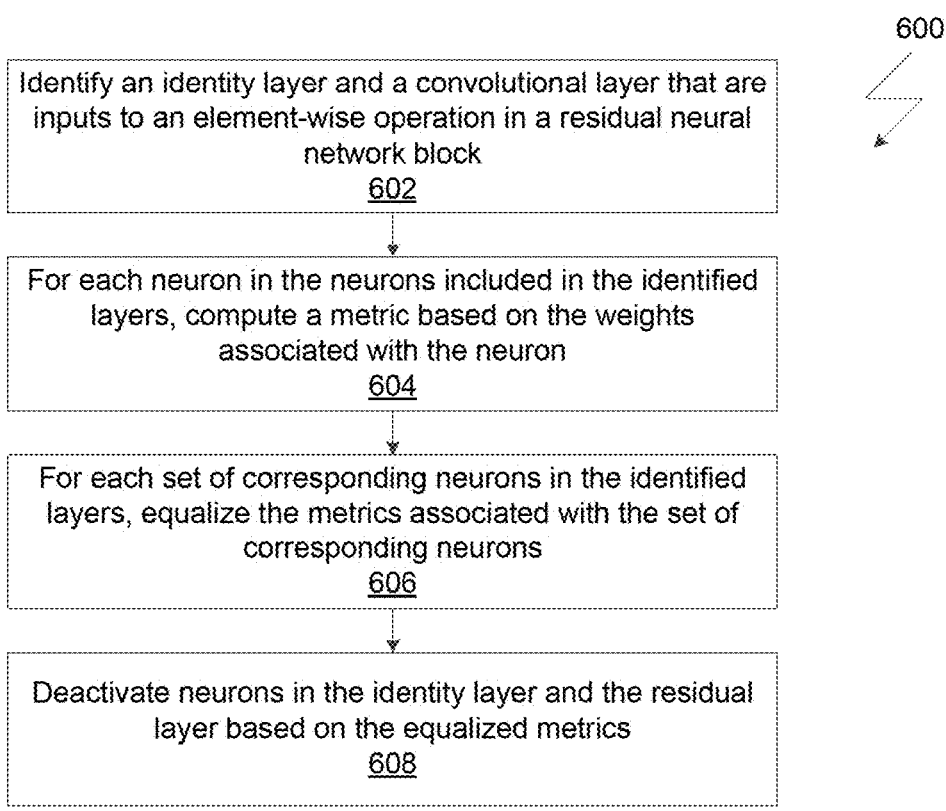
FIG. 6 is a flow diagram of method steps for pruning the convolutional layer and the identity layer in a residual network, according to various embodiments.

FIG. 6 is a flow diagram of method steps for pruning the convolutional layer and the identity layer in a residual network, according to various embodiments. Although the method steps are described in conjunction with the systems of FIGS. 1 and 3, persons skilled in the art will understand that any system configured to perform the method steps in any order falls within the scope of the present disclosure.

The method 600 begins at step 602, where the pruning engine 114 identifies the identity layer and the convolutional layer included in a residual network block that are inputs into an element-wise operation in the network block. At step 604, the pruning engine 114 computes, for each neuron included in the layers identified at step 602, a metric based on the weights associated with the neuron.

At step 606, the pruning engine 114, for each set of corresponding neurons included in the convolutional layer and the identity layer identified at step 602, equalizes the metrics associated with the set of corresponding neurons. As discussed above, corresponding neurons in convolutional layer and the identity layer include neurons that are in the same location within the respective layers. In one embodiment, in order to equalize the metrics associated with a set of corresponding neurons, the equalization engine 304 applies a union equalization operator to the metrics associated with the set of corresponding neurons. In one embodiment, all of the metrics associated with the set of corresponding neurons are set to the same value once the equalization operator is applied.

At step 608, the pruning engine 114 deactivates neurons from the convolutional layer and the identity layer identified at step 602 based on the equalized metrics. In one embodiment, the pruning engine 114 deactivates neurons from the convolutional layer and the identity layer that have an equalized metric that is less than a threshold pruning weight. In one embodiment, the pruned convolutional layer and the pruned identity layer are included in the pruned residual network instead of the convolutional layer and the identity layer included in the unpruned residual network.

Hardware Architecture

Figure 7:
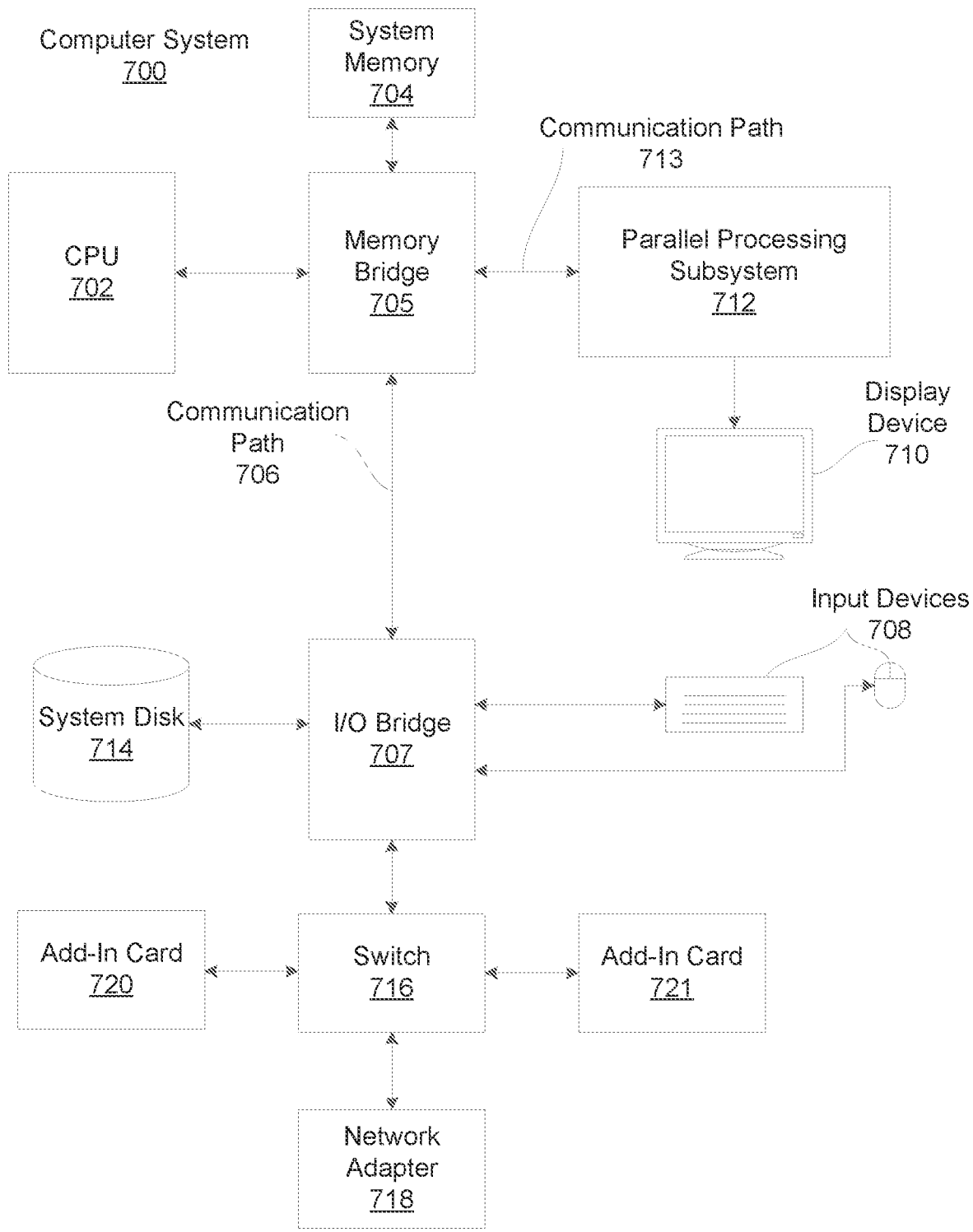
FIG. 7 is a block diagram illustrating a computer system configured to implement one or more aspects of various embodiments.

FIG. 7 is a block diagram illustrating a computer system 700 configured to implement one or more aspects of the present disclosure. In some embodiments, computer system 700 is a server machine operating in a data center or a cloud computing environment that provides scalable computing resources as a service over a network. For example, computer system 700 may be implemented in the training computing system 110, the server computing system 120, and/or the client computing system 130.

In various embodiments, computer system 700 includes, without limitation, a central processing unit (CPU) 702 and a system memory 704 coupled to a parallel processing subsystem 712 via a memory bridge 705 and a communication path 713. Memory bridge 705 is further coupled to an I/O (input/output) bridge 707 via a communication path 706, and I/O bridge 707 is, in turn, coupled to a switch 716.

In one embodiment, I/O bridge 707 is configured to receive user input information from optional input devices 708, such as a keyboard or a mouse, and forward the input information to CPU 702 for processing via communication path 706 and memory bridge 705. In some embodiments, computer system 700 may be a server machine in a cloud computing environment. In such embodiments, computer system 700 may not have input devices 708. Instead, computer system 700 may receive equivalent input information by receiving commands in the form of messages transmitted over a network and received via the network adapter 718. In one embodiment, switch 716 is configured to provide connections between I/O bridge 707 and other components of the computer system 700, such as a network adapter 718 and various add-in cards 720 and 721.

In one embodiment, I/O bridge 707 is coupled to a system disk 714 that may be configured to store content and applications and data for use by CPU 702 and parallel processing subsystem 712. In one embodiment, system disk 714 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 707 as well.

In various embodiments, memory bridge 705 may be a Northbridge chip, and I/O bridge 707 may be a Southbridge chip. In addition, communication paths 706 and 713, as well as other communication paths within computer system 700, may be implemented using any technically suitable protocols, including, without limitation, AGP (Accelerated Graphics Port), HyperTransport, or any other bus or point-to-point communication protocol known in the art.

In some embodiments, parallel processing subsystem 712 comprises a graphics subsystem that delivers pixels to an optional display device 710 that may be any conventional cathode ray tube, liquid crystal display, light-emitting diode display, or the like. In such embodiments, the parallel processing subsystem 712 incorporates circuitry optimized for graphics and video processing, including, for example, video output circuitry. As described in greater detail below in conjunction with FIGS. 8 and 9, such circuitry may be incorporated across one or more parallel processing units (PPUs), also referred to herein as parallel processors, included within parallel processing subsystem 712. In other embodiments, the parallel processing subsystem 712 incorporates circuitry optimized for general purpose and/or compute processing. Again, such circuitry may be incorporated across one or more PPUs included within parallel processing subsystem 712 that are configured to perform such general purpose and/or compute operations. In yet other embodiments, the one or more PPUs included within parallel processing subsystem 712 may be configured to perform graphics processing, general purpose processing, and compute processing operations. System memory 704 includes at least one device driver configured to manage the processing operations of the one or more PPUs within parallel processing subsystem 712.

In various embodiments, parallel processing subsystem 712 may be integrated with one or more of the other elements of FIG. 7 to form a single system. For example, parallel processing subsystem 712 may be integrated with CPU 702 and other connection circuitry on a single chip to form a system on chip (SoC).

In one embodiment, CPU 702 is the master processor of computer system 700, controlling and coordinating operations of other system components. In one embodiment, CPU 702 issues commands that control the operation of PPUs. In some embodiments, communication path 713 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 702, and the number of parallel processing subsystems 712, may be modified as desired. For example, in some embodiments, system memory 704 could be connected to CPU 702 directly rather than through memory bridge 705, and other devices would communicate with system memory 704 via memory bridge 705 and CPU 702. In other embodiments, parallel processing subsystem 712 may be connected to I/O bridge 707 or directly to CPU 702, rather than to memory bridge 705. In still other embodiments, I/O bridge 707 and memory bridge 705 may be integrated into a single chip instead of existing as one or more discrete devices. Lastly, in certain embodiments, one or more components shown in FIG. 7 may not be present. For example, switch 716 could be eliminated, and network adapter 718 and add-in cards 720, 721 would connect directly to I/O bridge 707.

Figure 8:
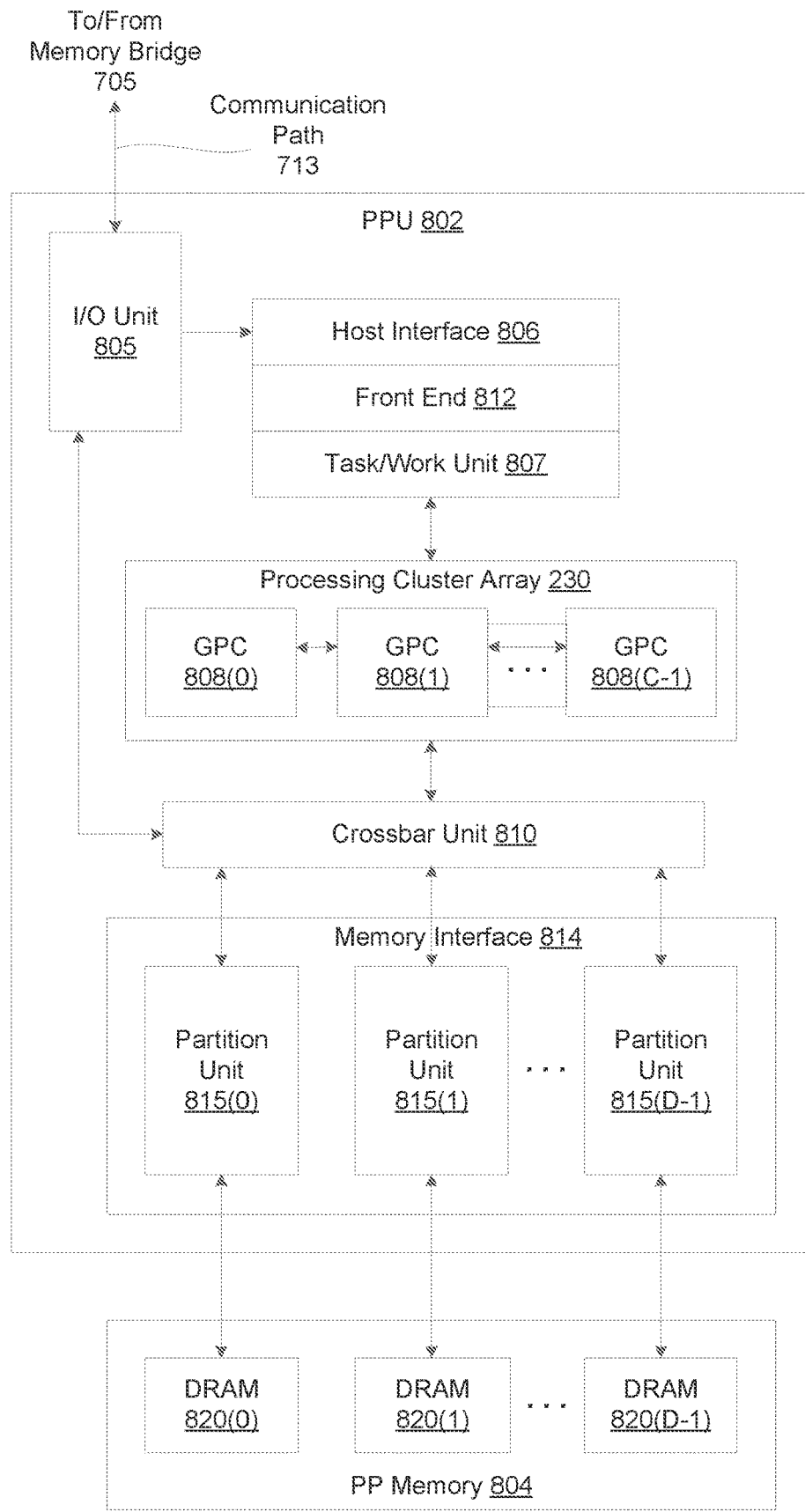
FIG. 8 is a block diagram of a parallel processing unit (PPU) included in the parallel processing subsystem of FIG. 7, according to various embodiments.

FIG. 8 is a block diagram of a parallel processing unit (PPU) 802 included in the parallel processing subsystem 712 of FIG. 7, according to various embodiments. Although FIG. 8 depicts one PPU 802, as indicated above, parallel processing subsystem 712 may include any number of PPUs 802. As shown, PPU 802 is coupled to a local parallel processing (PP) memory 804. PPU 802 and PP memory 804 may be implemented using one or more integrated circuit devices, such as programmable processors, application specific integrated circuits (ASICs), or memory devices, or in any other technically feasible fashion.

In some embodiments, PPU 802 comprises a graphics processing unit (GPU) that may be configured to implement a graphics rendering pipeline to perform various operations related to generating pixel data based on graphics data supplied by CPU 702 and/or system memory 704. When processing graphics data, PP memory 804 can be used as graphics memory that stores one or more conventional frame buffers and, if needed, one or more other render targets as well. Among other things, PP memory 804 may be used to store and update pixel data and deliver final pixel data or display frames to an optional display device 710 for display. In some embodiments, PPU 802 also may be configured for general-purpose processing and compute operations. In some embodiments, computer system 700 may be a server machine in a cloud computing environment. In such embodiments, computer system 700 may not have a display device 710. Instead, computer system 700 may generate equivalent output information by transmitting commands in the form of messages over a network via the network adapter 718.

In some embodiments, CPU 702 is the master processor of computer system 700, controlling and coordinating operations of other system components. In one embodiment, CPU 702 issues commands that control the operation of PPU 802. In some embodiments, CPU 702 writes a stream of commands for PPU 802 to a data structure (not explicitly shown in either FIG. 7 or FIG. 8) that may be located in system memory 704, PP memory 804, or another storage location accessible to both CPU 702 and PPU 802. A pointer to the data structure is written to a command queue, also referred to herein as a pushbuffer, to initiate processing of the stream of commands in the data structure. In one embodiment, the PPU 802 reads command streams from the command queue and then executes commands asynchronously relative to the operation of CPU 702. In embodiments where multiple pushbuffers are generated, execution priorities may be specified for each pushbuffer by an application program via device driver to control scheduling of the different pushbuffers.

In one embodiment, PPU 802 includes an I/O (input/output) unit 805 that communicates with the rest of computer system 700 via the communication path 713 and memory bridge 705. In one embodiment, I/O unit 805 generates packets (or other signals) for transmission on communication path 713 and also receives all incoming packets (or other signals) from communication path 713, directing the incoming packets to appropriate components of PPU 802. For example, commands related to processing tasks may be directed to a host interface 806, while commands related to memory operations (e.g., reading from or writing to PP memory 804) may be directed to a crossbar unit 810. In one embodiment, host interface 806 reads each command queue and transmits the command stream stored in the command queue to a front end 812.

As mentioned above in conjunction with FIG. 7, the connection of PPU 802 to the rest of computer system 700 may be varied. In some embodiments, parallel processing subsystem 712, which includes at least one PPU 802, is implemented as an add-in card that can be inserted into an expansion slot of computer system 700. In other embodiments, PPU 802 can be integrated on a single chip with a bus bridge, such as memory bridge 705 or I/O bridge 707. Again, in still other embodiments, some or all of the elements of PPU 802 may be included along with CPU 702 in a single integrated circuit or system of chip (SoC).

In one embodiment, front end 812 transmits processing tasks received from host interface 806 to a work distribution unit (not shown) within task/work unit 807. In one embodiment, the work distribution unit receives pointers to processing tasks that are encoded as task metadata (TMD) and stored in memory. The pointers to TMDs are included in a command stream that is stored as a command queue and received by the front end unit 812 from the host interface 806. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 807 receives tasks from the front end 812 and ensures that GPCs 808 are configured to a valid state before the processing task specified by each one of the TMDs is initiated. A priority may be specified for each TMD that is used to schedule the execution of the processing task. Processing tasks also may be received from the processing cluster array 830. Optionally, the TMD may include a parameter that controls whether the TMD is added to the head or the tail of a list of processing tasks (or to a list of pointers to the processing tasks), thereby providing another level of control over execution priority.

In one embodiment, PPU 802 implements a highly parallel processing architecture based on a processing cluster array 830 that includes a set of C general processing clusters (GPCs) 808, where C≥1. Each GPC 808 is capable of executing a large number (e.g., hundreds or thousands) of threads concurrently, where each thread is an instance of a program. In various applications, different GPCs 808 may be allocated for processing different types of programs or for performing different types of computations. The allocation of GPCs 808 may vary depending on the workload arising for each type of program or computation.

In one embodiment, memory interface 814 includes a set of D of partition units 815, where D≥1. Each partition unit 815 is coupled to one or more dynamic random access memories (DRAMs) 820 residing within PPM memory 804. In some embodiments, the number of partition units 815 equals the number of DRAMs 820, and each partition unit 815 is coupled to a different DRAM 820. In other embodiments, the number of partition units 815 may be different than the number of DRAMs 820. Persons of ordinary skill in the art will appreciate that a DRAM 820 may be replaced with any other technically suitable storage device. In operation, various render targets, such as texture maps and frame buffers, may be stored across DRAMs 820, allowing partition units 815 to write portions of each render target in parallel to efficiently use the available bandwidth of PP memory 804.

In one embodiment, a given GPC 808 may process data to be written to any of the DRAMs 820 within PP memory 804. In one embodiment, crossbar unit 810 is configured to route the output of each GPC 808 to the input of any partition unit 815 or to any other GPC 808 for further processing. GPCs 808 communicate with memory interface 814 via crossbar unit 810 to read from or write to various DRAMs 820. In some embodiments, crossbar unit 810 has a connection to I/O unit 805, in addition to a connection to PP memory 804 via memory interface 814, thereby enabling the processing cores within the different GPCs 808 to communicate with system memory 704 or other memory not local to PPU 802. In the embodiment of FIG. 8, crossbar unit 810 is directly connected with I/O unit 805. In various embodiments, crossbar unit 810 may use virtual channels to separate traffic streams between the GPCs 808 and partition units 815.

In one embodiment, GPCs 808 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 802 is configured to transfer data from system memory 704 and/or PP memory 804 to one or more on-chip memory units, process the data, and write result data back to system memory 704 and/or PP memory 804. The result data may then be accessed by other system components, including CPU 702, another PPU 802 within parallel processing subsystem 712, or another parallel processing subsystem 712 within computer system 700.

In one embodiment, any number of PPUs 802 may be included in a parallel processing subsystem 712. For example, multiple PPUs 802 may be provided on a single add-in card, or multiple add-in cards may be connected to communication path 713, or one or more of PPUs 802 may be integrated into a bridge chip. PPUs 802 in a multi-PPU system may be identical to or different from one another. For example, different PPUs 802 might have different numbers of processing cores and/or different amounts of PP memory 804. In implementations where multiple PPUs 802 are present, those PPUs may be operated in parallel to process data at a higher throughput than is possible with a single PPU 802. Systems incorporating one or more PPUs 802 may be implemented in a variety of configurations and form factors, including, without limitation, desktops, laptops, handheld personal computers or other handheld devices, servers, workstations, game consoles, embedded systems, and the like.

Figure 9:
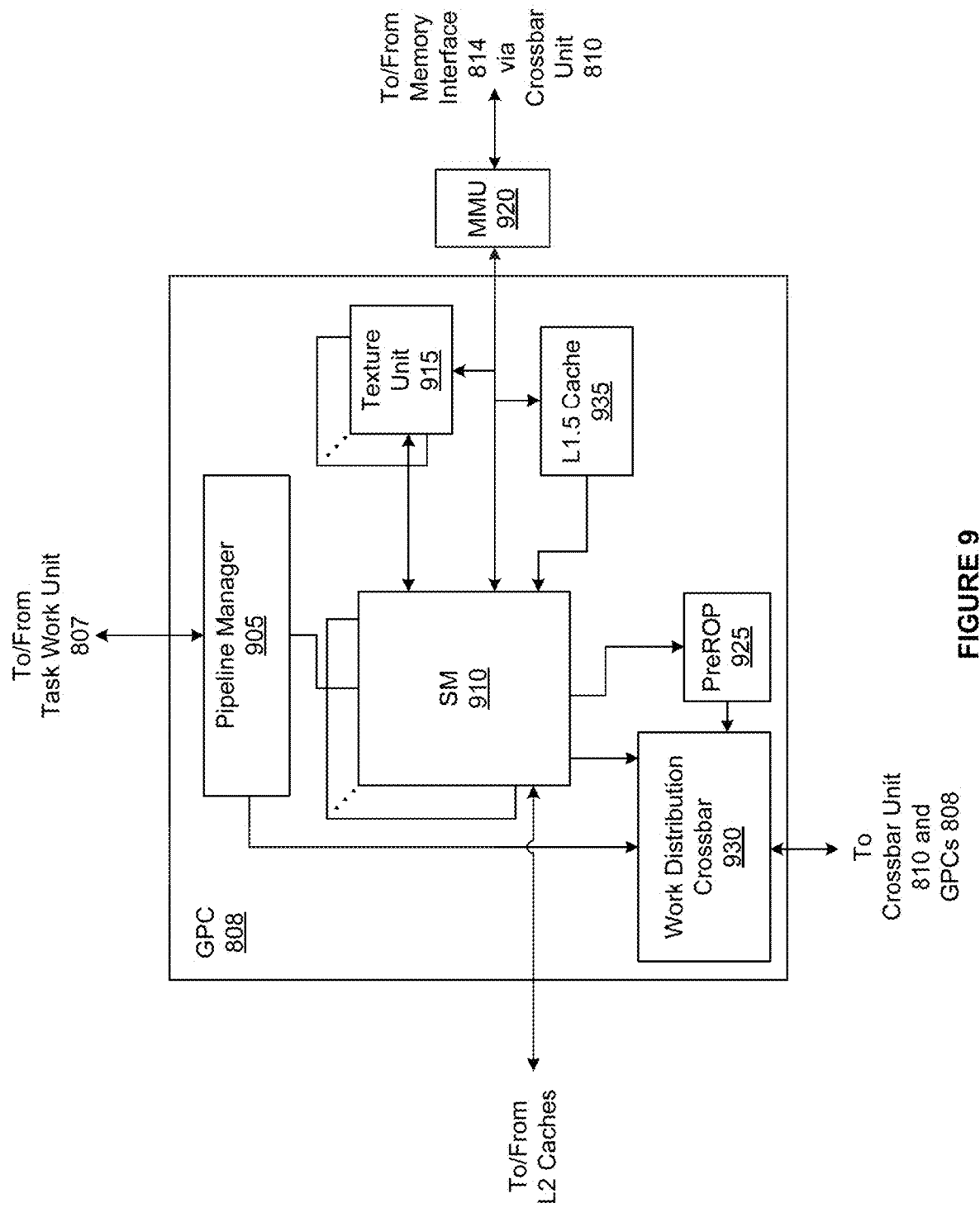
FIG. 9 is a block diagram of a general processing cluster (GPC) included in the parallel processing unit (PPU) of FIG. 8, according to various embodiments.

FIG. 9 is a block diagram of a general processing cluster (GPC) 808 included in the parallel processing unit (PPU) 802 of FIG. 8, according to various embodiments. As shown, the GPC 808 includes, without limitation, a pipeline manager 905, one or more texture units 915, a preROP unit 925, a work distribution crossbar 930, and an L1.5 cache 935.

In one embodiment, GPC 808 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 808. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 808 is controlled via a pipeline manager 905 that distributes processing tasks received from a work distribution unit (not shown) within task/work unit 807 to one or more streaming multiprocessors (SMs) 910. Pipeline manager 905 may also be configured to control a work distribution crossbar 930 by specifying destinations for processed data output by SMs 910.

In various embodiments, GPC 808 includes a set of M of SMs 910, where M≥1. Also, each SM 910 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 910 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In various embodiments, each SM 910 includes multiple processing cores. In one embodiment, the SM 910 includes a large number (e.g., 128, etc.) of distinct processing cores. Each core may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores include 64 single-precision (32-bit) floating point cores, 64 integer cores, 32 double-precision (64-bit) floating point cores, and 8 tensor cores.

In one embodiment, tensor cores configured to perform matrix operations, and, in one embodiment, one or more tensor cores are included in the cores. In particular, the tensor cores are configured to perform deep learning matrix arithmetic, such as convolution operations for neural network training and inferencing. In one embodiment, each tensor core operates on a 4×4 matrix and performs a matrix multiply and accumulate operation D=A×B+C, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++API, exposes specialized matrix load, matrix multiply and accumulate, and matrix store operations to efficiently use tensor cores from a CUDA-C++ program. At the CUDA level, the warp-level interface assumes 16×16 size matrices spanning all 32 threads of the warp.

Neural networks rely heavily on matrix math operations, and complex multi-layered networks require tremendous amounts of floating-point performance and bandwidth for both efficiency and speed. In various embodiments, with thousands of processing cores, optimized for matrix math operations, and delivering tens to hundreds of TFLOPS of performance, the SMs 910 provide a computing platform capable of delivering performance required for deep neural network-based artificial intelligence and machine learning applications.

In various embodiments, each SM 910 may also comprise multiple special function units (SFUs) that perform special functions (e.g., attribute evaluation, reciprocal square root, and the like). In one embodiment, the SFUs may include a tree traversal unit configured to traverse a hierarchical tree data structure. In one embodiment, the SFUs may include texture unit configured to perform texture map filtering operations. In one embodiment, the texture units are configured to load texture maps (e.g., a 2D array of texels) from memory and sample the texture maps to produce sampled texture values for use in shader programs executed by the SM. In various embodiments, each SM 910 also comprises multiple load/store units (LSUs) that implement load and store operations between the shared memory/L1 cache and register files internal to the SM 910.

In one embodiment, each SM 910 is configured to process one or more thread groups. As used herein, a "thread group" or "warp" refers to a group of threads concurrently executing the same program on different input data, with one thread of the group being assigned to a different execution unit within an SM 910. A thread group may include fewer threads than the number of execution units within the SM 910, in which case some of the execution may be idle during cycles when that thread group is being processed. A thread group may also include more threads than the number of execution units within the SM 910, in which case processing may occur over consecutive clock cycles. Since each SM 910 can support up to G thread groups concurrently, it follows that up to G*M thread groups can be executing in GPC 808 at any given time.

Additionally, in one embodiment, a plurality of related thread groups may be active (in different phases of execution) at the same time within an SM 910. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 910, and m is the number of thread groups simultaneously active within the SM 910. In some embodiments, a single SM 910 may simultaneously support multiple CTAs, where such CTAs are at the granularity at which work is distributed to the SMs 910.

In one embodiment, each SM 910 contains a level one (L1) cache or uses space in a corresponding L1 cache outside of the SM 910 to support, among other things, load and store operations performed by the execution units. Each SM 910 also has access to level two (L2) caches (not shown) that are shared among all GPCs 808 in PPU 802. The L2 caches may be used to transfer data between threads. Finally, SMs 910 also have access to off-chip "global" memory, which may include PP memory 804 and/or system memory 704. It is to be understood that any memory external to PPU 802 may be used as global memory. Additionally, as shown in FIG. 9, a level one-point-five (L1.5) cache 935 may be included within GPC 808 and configured to receive and hold data requested from memory via memory interface 814 by SM 910. Such data may include, without limitation, instructions, uniform data, and constant data. In embodiments having multiple SMs 910 within GPC 808, the SMs 910 may beneficially share common instructions and data cached in L1.5 cache 935.

In one embodiment, each GPC 808 may have an associated memory management unit (MMU) 920 that is configured to map virtual addresses into physical addresses. In various embodiments, MMU 920 may reside either within GPC 808 or within the memory interface 814. The MMU 920 includes a set of page table entries (PTEs) used to map a virtual address to a physical address of a tile or memory page and optionally a cache line index. The MMU 920 may include address translation lookaside buffers (TLB) or caches that may reside within SMs 910, within one or more L1 caches, or within GPC 808.

In one embodiment, in graphics and compute applications, GPC 808 may be configured such that each SM 910 is coupled to a texture unit 915 for performing texture mapping operations, such as determining texture sample positions, reading texture data, and filtering texture data.

In one embodiment, each SM 910 transmits a processed task to work distribution crossbar 930 in order to provide the processed task to another GPC 808 for further processing or to store the processed task in an L2 cache (not shown), parallel processing memory 804, or system memory 704 via crossbar unit 810. In addition, a pre-raster operations (preROP) unit 925 is configured to receive data from SM 910, direct data to one or more raster operations (ROP) units within partition units 815, perform optimizations for color blending, organize pixel color data, and perform address translations.

It will be appreciated that the architecture described herein is illustrative and that variations and modifications are possible. Among other things, any number of processing units, such as SMs 910, texture units 915, or preROP units 925, may be included within GPC 808. Further, as described above in conjunction with FIG. 8, PPU 802 may include any number of GPCs 808 that are configured to be functionally similar to one another so that execution behavior does not depend on which GPC 808 receives a particular processing task. Further, each GPC 808 operates independently of the other GPCs 808 in PPU 802 to execute tasks for one or more application programs.

In sum, input layers of an element-wise operation in a neural network can be pruned such that the shape (e.g., the height, the width, and the depth) of the pruned layers matches. In various embodiments, a pruning engine identifies all of the input layers into the element-wise operation. For each set of corresponding neurons in the input layers, the pruning engine equalizes the metrics associated with the neurons to generate an equalized metric associated with the set. The pruning engine prunes the input layers based on the equalized metrics generated for each unique set of corresponding neurons. In one embodiment, when the equalized metric associated with a given set of corresponding neurons is below a pruning threshold, the pruning engine deactivates the neurons in the set of corresponding neurons from the input layers.

At least one technological advantage of the disclosed techniques is that, subsequent to the pruning operations, the shapes, for example, the width, height, and depth, of the pruned input layers to an element-wise operation in a neural network match. Further, subsequent to the pruning operations, corresponding sets of neurons across multiple input layers are located in the same position within each respective pruned input layer. Thus, the element-wise operation can be accurately performed on the pruned input layers.

1. In some embodiments, a computer-implemented method comprises identifying a plurality of corresponding neurons in a plurality of network layers within a neural network, wherein each neuron in the plurality of corresponding neurons is located at a matching location within a different network layer included in the plurality of network layers, and deactivating each of the plurality of corresponding neurons from the plurality of network layers based, at least in part, on a metric associated with the plurality of corresponding neurons.

2. The method of clause 1, further comprising computing the metric associated with the plurality of corresponding neurons based on one or more weights associated with each neuron in the plurality of corresponding neurons.

3. The method of clause 1 or 2, wherein computing the metric comprises performing one or more equalization operations on the one or more weights associated with each neuron in the plurality of corresponding neurons to generate the metric.

4. The method of any of clauses 1-3, wherein performing the one or more equalization operations comprises applying an equalization operator to one or more weights assigned to a first neuron in the plurality of corresponding neurons and one or more weights assigned to a second neuron in the plurality of corresponding neurons.

5. The method of any of clauses 1-4, wherein the one or more equalization operations comprises at least one of an arithmetic mean operation, a geometric mean operation, a union operation, and an intersection operation.

6. The method of any of clauses 1-5, wherein performing the one or more equalization operations comprises determining that at least one neuron in the plurality of corresponding neurons is associated with an individual metric that is at or above a threshold, and setting the metric associated with the plurality of corresponding neurons to the threshold.

7. The method of any of clauses 1-6, wherein the neural network comprises a residual network, and wherein the plurality of network layers includes a convolutional layer of the residual network and an identity layer of the residual network.

8. The method of any of clauses 1-7, wherein each of the plurality of corresponding neurons produces a different input into a given computational component of the neural network.

9. In some embodiments, a computer-implemented method comprises identifying a plurality of corresponding neurons in a plurality of network layers within a neural network, wherein each of the plurality of corresponding neurons is associated with a matching feature type, and deactivating each of a plurality of corresponding neurons from the plurality of network layers within a neural network based, at least in part, on a metric associated with the plurality of corresponding neurons.

10. The method of clause 9, wherein each of the plurality of corresponding neurons computationally determines a probability of a feature having the feature type being present in given input data.

11. The method of clause 9 or 10, further comprising computing the metric associated with the plurality of corresponding neurons based on one or more weights associated with each neuron in the plurality of corresponding neurons.

12. The method of any of clauses 9-11, wherein computing the metric comprises performing one or more equalization operations on the one more weights associated with each neuron in the plurality of corresponding neurons to generate the metric.

13. The method of any of clauses 9-12, wherein performing the one or more equalization operations comprises applying an equalization operator to one or more weights assigned to a first neuron in the plurality of corresponding neurons and one or more weights assigned to a second neuron in the plurality of corresponding neurons.

14. The method of any of clauses 9-13, wherein the one or more equalization operations comprises at least one of an arithmetic mean operation, a geometric mean operation, a union operation, and an intersection operation.

15. The method of any of clauses 9-14, wherein performing the one or more equalization operations comprises determining that at least one neuron in the plurality of corresponding neurons is associated with an individual metric that is at or above a threshold, and setting the metric associated with the plurality of corresponding neurons to the threshold.

16. The method of any of clauses 9-15, wherein the neural network comprises a residual network, and wherein the plurality of network layers includes a convolutional layer of the residual network and an identity layer of the residual network.

17. In some embodiments, a processor comprises a plurality of computational logic units to generate a plurality of results based on one or more inputs and one or more weight values, wherein the plurality of computational logic units are to be programmed according to a neural network architecture comprising a plurality of network layers, wherein each of the plurality of computational logic units corresponds to a different layer in the plurality of layers and is located at a matching location within the corresponding layer, and wherein the plurality of computational logic units are deactivated based, at least in part, on a metric associated with the one or more weight values.

18. The processor of clause 17, wherein each of the plurality of corresponding neurons is associated with a matching feature type.

19. The processor of clause 17 or 18, wherein the metric is computed based on an equalization operation performed on the one or more weight values.

20. The processor of any of clauses 17-19, wherein the neural network architecture comprises a residual network, and wherein the plurality of network layers includes a convolutional layer of the residual network and an identity layer of the residual network.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
computing an average weight value of a plurality of neurons of one or more neural networks, wherein each of the plurality of neurons is located within at a matching location within a different layer included in a plurality of locations of different layers of the one or more neural networks, and wherein each of the plurality of neurons is associated with a matching feature type;
replacing a weight value of each of the plurality of neurons with the average weight value; and
deactivating each of the plurality of neurons based, at least in part, on whether the replaced weight value of the plurality of neurons exceeds a threshold value.

2. The method of claim 1, wherein one or more outputs of the plurality of different layers are processed using one or more element-wise operations.

3. The method of claim 1, wherein deactivating each of the plurality of neurons comprises performing one or more equalization operations on weights associated with the plurality of neurons.

4. The method of claim 3, wherein performing the one or more equalization operations comprises applying an equalization operator to the weights associated with the plurality of neurons.

5. The method of claim 1, wherein the average weight value is computed using an arithmetic mean or a geometric mean of weights associated with the plurality of neurons.

6. The method of claim 1, wherein deactivating each of a plurality of neurons further comprises:
obtaining a desired dimensionality of the plurality of different layers to be deactivated.

7. The method of claim 1, wherein the one or more neural networks comprise a residual network, and wherein the plurality of different layers includes a convolutional layer of the residual network and an identity layer of the residual network.

8. The method of claim 1, wherein each of the plurality of neurons produces a different input into a given computational component of the one or more neural networks.

9. The method of claim 1, wherein the weight value is computed using an arithmetic mean or a geometric mean of the weights associated with the plurality of neurons.

10. One or more processors comprising circuitry to:
computing compute an average weight value of a plurality of neurons of one or more neural networks, wherein each of the plurality of neurons is located within at a matching location within a different layer included in a plurality of locations of different layers of one or more neural networks, and wherein each of the plurality of neurons is associated with a matching feature type;
replacing replace a weight value of each of the plurality of neurons with the average weight value; and
deactivate each of the plurality of neurons based, at least in part, on whether the replaced weight value of the plurality of neurons exceeds a threshold value.

11. The one or more processors of claim 10, wherein one or more outputs of the plurality of different layers are processed using one or more element-wise operations.

12. The one or more processors of claim 10, wherein deactivation of each of the plurality of neurons comprise computing L2 norm of weights associated with the plurality of neurons.

13. The one or more processors of claim 10, wherein deactivation of each of the plurality of neurons comprises performing one or more equalization operations on weights associated with the plurality of neurons.

14. The one or more processors of claim 13, wherein performing the one or more equalization operations comprises applying an equalization operator to the weights associated with the plurality of neurons.

15. The one or more processors of claim 10, wherein the average weight value is computed using an arithmetic mean or a geometric mean of the weights associated with the plurality of neurons.

16. The one or more processors of claim 10, wherein deactivation each of the plurality of neurons comprises:
obtaining a desired dimensionality of the plurality of different layers to be deactivated.

17. The one or more processors of claim 10, wherein the one or more neural networks comprise a residual network, and wherein the plurality of different layers include a convolutional layer of the residual network and an identity layer of the residual network.

18. A system comprising: one or more processors to:
compute an average weight value of a plurality of neurons of one or more neural networks, wherein each of the plurality of neurons is located at a within matching location within a different layer included in a plurality of locations of different layers of the one or more neural networks, and wherein each of the plurality of neurons is associated with a matching feature type;
replace a weight value of each of the plurality of neurons with the average weight value; and
deactivate each of the plurality of neurons based, at least in part, on whether the replaced weight value of the plurality of neurons exceeds a threshold value.

19. The system of claim 18, wherein one or more outputs of the plurality of different layers are processed using one or more element-wise operations.

20. The system of claim 18, wherein the deactivation of the plurality of neurons comprises performing an equalization operation on weights associated with the plurality of neurons.

21. The system of claim 18, wherein the one or more neural networks comprise a residual network, and wherein the plurality of different layers includes a convolutional layer of the residual network and an identity layer of the residual network.

* * * * *